May 9, 1961 P. G. VICARD 2,983,332
PROCESS AND APPARATUS FOR THE PURIFICATION OF GASES
Filed Oct. 25, 1957

PIERRE GEORGES VICARD
INVENTOR
by *Irwin S. Thompson*
ATTORNEY

United States Patent Office 2,983,332
Patented May 9, 1961

2,983,332

PROCESS AND APPARATUS FOR THE PURIFICATION OF GASES

Pierre Georges Vicard, 15 Cours Eugenie, Lyon, France

Filed Oct. 25, 1957, Ser. No. 692,475

Claims priority, application France Nov. 2, 1956

10 Claims. (Cl. 183—7)

There are numerous means for scrubbing gases and in particular for removing dust therefrom and for eliminating industrial and other flue gases. The treatments to which gases or flue gases to be cleaned are subjected, however, each taken separately, perform only a part of the work which would be necessary to obtain complete purification and, to obtain complete results, it would be expedient to pass, after each of these partial operations, to the following one, which would necessitate separate apparatus and sometimes also an adequate intermediate treatment. Now, good results in industry require speed, simplification, efficiency and economy.

The present invention provides improvements in means employed for scrubbing gases which satisfy the desiderata of industry mentioned above by reducing the number of successive operations heretofore required, the scale of the necessary preparations, the over-all dimensions of the apparatus and the time required for obtaining final results, permitting stricter control of the scrubbing operation in progress at its various stages, increasing efficiency and making a considerable saving of time.

This invention comprises here a system, method or process for scrubbing gases, on the one hand, and an apparatus for carrying the process in question into effect, on the other hand, which permit, in characteristic manner, of operating continuously, that is to say without stoppages, without discontinuity, without loss of time and without risk, all of which are conditions favourable to productivity and economy. The invention permits, in particular, of obtaining a continuous flow of the scrubbed or purified gas and a likewise continuous evacuation of the particles separated from the gas, even submicronic particles.

In this field, it is well known that the difficulties become very great when the particles are of submicronic dimensions and their composition is very varied, both in nature and form.

It is precisely in these conditions that the new solution proposed is very effective. This is all the more advantageous as the apparatus is of small over-all dimensions and the operation thereof requires little maintenance and it lends itself very well to continuous running.

One process consists essentially in the complete combination of the following successive operations:

(1) The gas is saturated with water vapour, then supersaturated with water in the state of a dense and stable mist.

(2) In this state, the gas is passed through a Venturi wherein it is subjected to sudden cooling sufficient to cause in the innermost portion of its mass the condensation of a part of the vapour contained therein on the particles forming condensation nuclei.

(3) The gas supersaturated with water in the state of mist with its particles enveloped in condensed water is then subjected to an electric field of sufficient intensity to ensure the ionisation and the electrical precipitation of the still wet particles on appropriate precipitating surfaces. Streaming over the precipitating surfaces ensures evacuation of the particles.

By this process, the submicronic particles are also enveloped in water, enlarged and converted into very fine droplets through the condensation and can then easily be ionised and precipitated electrically on precipitating surfaces and then evacuated by the streaming down of the mist which is likewise precipitated.

The invention is illustrated diagrammatically in the accompanying drawings, which are given only by way of example, and in which.

Figures 1, 2, 3:
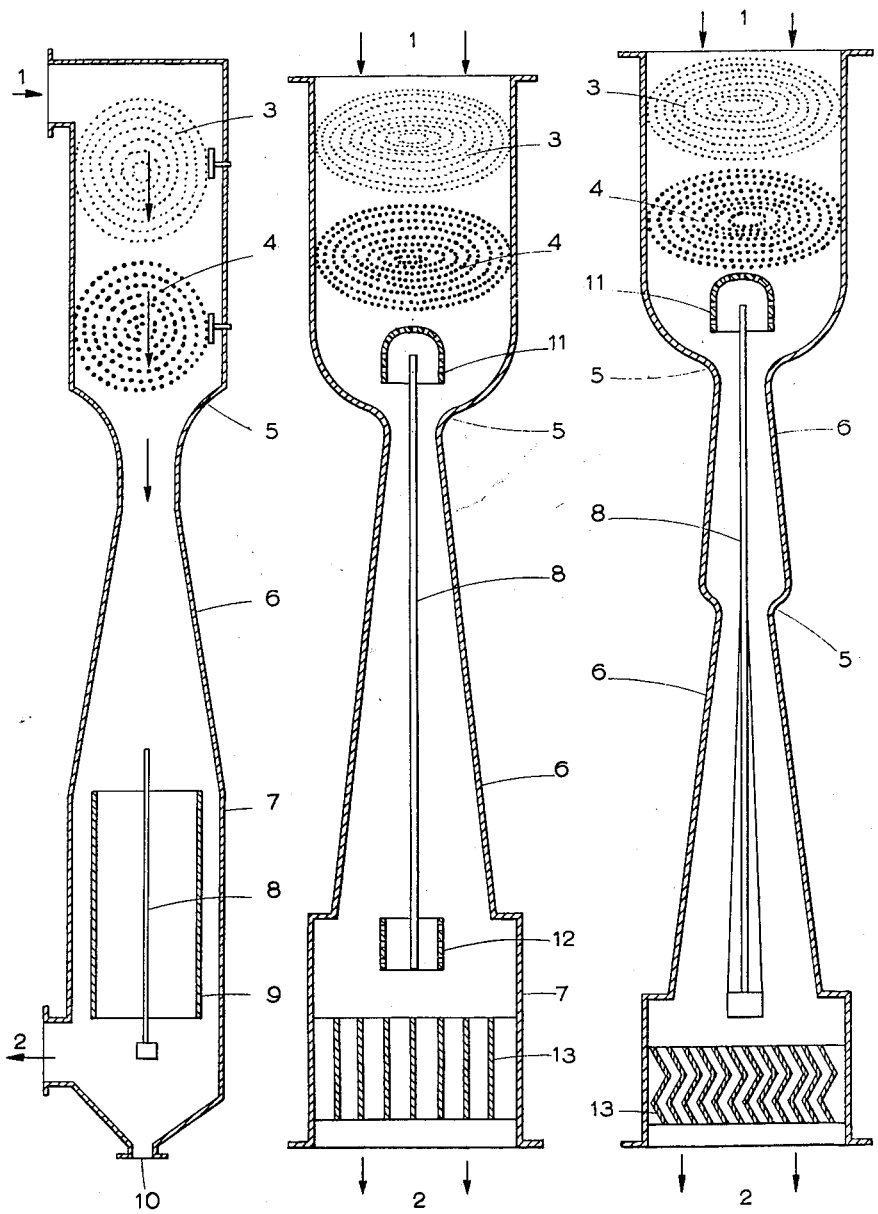
Figure 1 is a sectional view of an apparatus made in accordance with the invention.
Figure 2 is a similar view showing a number of modifications.
Figure 3 is a similar view showing still another form of the apparatus.

The apparatus consists of an assembly in which the gas is set in circulation by any suitable means (fan for example) in the direction of the arrows. The gas enters at 1 and issues at 2, passing in succession through several chambers as described as follows:

Firstly the gas enters a humidification chamber 3 in which water is atomised in the form of a very fine mist and evaporates, saturating the gas under treatment with water vapour.

The saturated gas then passes to a second humidification chamber 4 similar to the previous one and in which water, atomised in the form of very fine mist and being no longer able to evaporate in the completely saturated gas, remains in suspension in the state of mist.

A convergent-divergent tube 5 and 6 known as a Venturi converts part of the pressure of the gas from the chamber 4 into kinetic energy in the converging portion 5, which results in a pressure drop and in a fall in temperature which takes place suddenly in the innermost portion of the gaseous mass and in a uniform manner, causing a condensation of vapour on the particles forming condensation nuclei. The droplets of water in suspension pass through the converging portion without undergoing cooling through expansion owing to their relative great mass and are thus at a higher temperature than the condensed water on the particles.

The gas under treatment is then passed into an insulated chamber 7 in which there is an intense electric field created between one or more wires or electrodes 8 and surfaces 9 through the emission of high-voltage current with a corona effect emanating from the electrodes 8, which are electrically insulated and connected to an installation for producing high-voltage current according to one of the known methods.

The droplets of pure water and those imprisoning the particles are ionised and move towards the precipitating surfaces 9, which are connected to earth and on which they give up their electric charge and over which they run down, thus reliably and continually ensuring the washing of the surfaces and the evacuation of the particles entrained by the water. The water trickling down entraining the particles out of the gaseous stream flows off through the outlet orifice such as 10.

A modified embodiment of the invention consists essentially, as far as the process is concerned, in effecting the ionisation not after but during the condensation of the vapour on the particles forming condensation nuclei.

To achieve this aim, having regard to the minimum time required for ionisation, the intense electric field with the corona effect must extend throughout the convergent-divergent tube, as illustrated in Fig. 2.

Ionisation by corona effect may be secured by one of the known means preferably one or more wires disposed in a network either parallel or normal to the stream of gas) and the cross-section for the flow of the gas through the convergent-divergent tube known as a Venturi may be circular, rectangular or of any other geometrical shape.

The insulated chamber (with the ionisation network 8) extends to the neck of the convergent-divergent Venturi tube 5 and 6.

At the entry to and the exit from the Venturi, the high-voltage ionisation network or electrode 8 can be protected against any excess of mist, moisture or dust by any suitable means, for example by the ionisation effect itself between the electrode 8 and a protecting wall such as 11 and 12, which wall is dimensioned to maintain the corona effect. The wall may be perforated so as not to impede the flow of the gas.

It is thus possible to employ this modified process with a very heavy concentration of droplets of mist which may attain up to several tens, and even hundreds, of grams per cubic metre.

The droplets of very dense mist are ionised at the inlet of the Venturi and agglomerate the particles unamenable to ionisation or those which are ionised only very slowly, as is often the case with submicronic particles.

This agglomeration is possible owing to the very considerable relative movement between the submicronic particles and the droplets as they enter the Venturi.

By way of example, in the converging portion, the gas and the submicronic particles may be subjected in $\frac{1}{1000}$ of a second to an acceleration of velocity from 20 to 180 km./hour, which cannot be followed by the droplets subject to the forces of inertia, and this results in a relative velocity of 50 to 70 km./hour between the submicronic particles which are still neutral and the ionised droplets. This sweeping action takes place with electrostatic attraction and in the stage of condensation on the particles.

On emerging from the convergent-divergent Venturi tube, the gas entrains the droplets and the wet and ionised micronic particles with which the submicronic particles have become agglomerated, which latter are likewise wet but have not had time to become ionised. Part of this mixture streams down over the precipitating walls. It is an easy matter to separate the gas completely by placing after the diverging portion 6 a precipitating element 13 connected to earth.

In certain cases, the use of multiple convergent-divergent Venturi tubes, for example two such tubes, as shown in Figure 3, enables the treatment to be performed in stages and greater effectiveness to be obtained for the ionisation and agglomeration effects produced by the above-described sweeping action between the particles wetted by the condensation and the droplets of water, which have different masses and electric charges.

It is important to observe that, for even greater efficiency, the precipitating element (reference 13) may be replaced by an assembly of electrodes and precipitating surfaces, simply to create an electric field capable of polarising the droplets of the mist and permit agglomeration by the sweeping action with electrostatic attraction between the wet, electrically charged particles and the neutral, but polarised, droplets of mist.

In comparison with the apparatus described and claimed in my prior U.S. Patent 2,579,282, the improvements effected make the new apparatus a completely efficient one. It can free gases of particles which are unamenable to ionisation or undergo the latter only after a certain time, a type of dust which is feared in conventional electrical filters which are unable to retain these particles.

The process and apparatus described are applicable to all gases and all solid or liquid particles in suspension in the gas, even submicronic particles, and use can be made of any other liquid more suitable than water.

According to the rate of the flow of gas, there may be one or more arrangements operating in parallel side by side, possibly also several arrangements operating in series one after the other and possibly, again, the two combined, in parallel and in series.

The apparatus may be constructed to operate in a vertical position or in a horizontal position.

I claim:

1. A method for removing fine foreign particles from gases which consists in saturating the gas with the vapor of a liquid; in super-saturating the saturated gas with a fine mist of said liquid; in passing the super-saturated gas through a Venturi to subject same to a transient pressure drop in the neck portion of the Venturi, said pressure drop being accompanied by a sudden cooling which causes condensation of said vapor on said particles; in submitting said particles to an ionizing electric field before the liquid condensed on them has again evaporated; and in subsequently separating the ionized particles from the gas.

2. In a method as claimed in claim 1, the step of precipitating said ionized particles on precipitating electrostatic surfaces.

3. A method for removing fine foreign particles from gases which consists in saturating the gas with the vapor of a liquid; in super-saturating the saturated gas with a fine mist of said liquid; in passing the super-saturated gas through a Venturi to subject same to a transient pressure drop in the neck portion of the Venturi, said pressure drop being accompanied by a sudden cooling which causes condensation of said vapor on said particles; in submitting said particles to an ionizing electric field within the neck portion of said Venturi; and in subsequently separating the ionized particles from the gas.

4. In a method as claimed in claim 3, the step of precipitating said ionized particles on precipitating electrostatic surfaces.

5. A device for removing fine particles from gases, comprising spraying means to saturate said gases with the vapor of a liquid; spraying means to super-saturate said saturated gases with a fine mist of droplets of said liquid; a Venturi through which said super-saturated gases are passed to be submitted in the neck portion of the said Venturi to a transient pressure drop accompanied by a sudden cooling which causes condensation of said vapor on said particles; an ionizing electrode system at least in part disposed in the outlet portion of said Venturi to ionize said particles before the liquid condensed on them has again evaporated; and means to separate said ionized particles from said gases.

6. In a device as claimed in claim 5, said separating means comprising precipitating surfaces disposed about said electrode system.

7. A device for removing fine particles from gases, comprising spraying means to super-saturate said gases with a fine mist of droplets of said liquid; a Venturi through which said super-saturated gases are passed to be submitted in the neck portion of the said Venturi to a transient pressure drop accompanied by a sudden cooling which causes condensation of said vapor on said particles; an ionizing electrode system extending substantially axially through said Venturi from the neck portion to the outlet end thereof; and means to separate said ionized particles from said gases.

8. In a device as claimed in claim 7, said separating means comprising precipitating surfaces disposed downstream with respect to said electrode system.

9. In a device as claimed in claim 7, further comprising a substantially cup-shaped protecting wall disposed on the upstream end of said electrode system in spaced relation thereto, and a substantially cylindrical protective wall surrounding the downstream end of said electrode system in spaced relation thereto.

10. In a device as claimed in claim 9, in which said cup-shaped protecting wall and said cylindrical protective wall are perforated.

References Cited in the file of this patent

UNITED STATES PATENTS

| | | |
|---|---|---|
| 1,329,737 | Wolcott | Feb. 3, 1920 |
| 1,329,844 | Meston | Feb. 3, 1920 |
| 1,381,719 | McGee et al. | June 14, 1921 |
| 1,413,877 | Schmidt | Apr. 25, 1922 |
| 1,871,815 | Meston et al. | Aug. 16, 1932 |
| 1,940,198 | Wagner | Dec. 19, 1933 |
| 2,579,282 | Vicard | Dec. 18, 1951 |

FOREIGN PATENTS

| | | |
|---|---|---|
| 597,577 | Germany | May 28, 1934 |